United States Patent [19]
Burgess et al.

[11] Patent Number: 5,902,535
[45] Date of Patent: May 11, 1999

[54] RESIN FILM INFUSION MOLD TOOLING AND MOLDING METHOD

[75] Inventors: Roger Burgess, Long Beach; Brian Grossheim, Huntington Beach; Karbis Mouradian, Glendale; Patrick J. Thrash, Huntington Beach, all of Calif.

[73] Assignee: McDonnell Douglas Corporation, Hazelwood, Mich.

[21] Appl. No.: 08/902,693

[22] Filed: Jul. 30, 1997

[51] Int. Cl.$^6$ ..................................................... B29C 70/44
[52] U.S. Cl. .......................... 264/257; 264/511; 264/258; 425/389
[58] Field of Search .................................... 264/257, 258, 264/510, 511, 571, 313, 314; 425/112, 117, 389, 388

[56] References Cited

U.S. PATENT DOCUMENTS

| | | |
|---|---|---|
| 3,146,148 | 8/1964 | Mitchella et al. ....................... 264/571 |
| 4,622,091 | 11/1986 | Letterman ................................ 264/258 |
| 5,368,807 | 11/1994 | Lindsay .................................... 264/570 |
| 5,451,377 | 9/1995 | Asher et al. .............................. 264/570 |
| 5,547,629 | 8/1996 | Diesen et al. ............................ 264/258 |
| 5,707,576 | 1/1998 | Asher ....................................... 264/257 |

Primary Examiner—Mathieu D. Vargot
Attorney, Agent, or Firm—Brooks & Kushman P.C.

[57] ABSTRACT

A mold apparatus and method for resin film infusion molding including an outer mold tool having a facing sheet adapted to support a resin film and preform assembly. The facing sheet includes attachment features extending therefrom. An inner mold tool is positioned on the facing sheet to enclose the resin film and preform assembly for resin film infusion molding. The inner mold tool includes a plurality of mandrels positioned for engagement with the resin film and preform assembly. Each mandrel includes a slot formed therein. A plurality of locating bars cooperate with the slots and with the attachment features for locating the mandrels longitudinally on the outer mold tool.

9 Claims, 7 Drawing Sheets

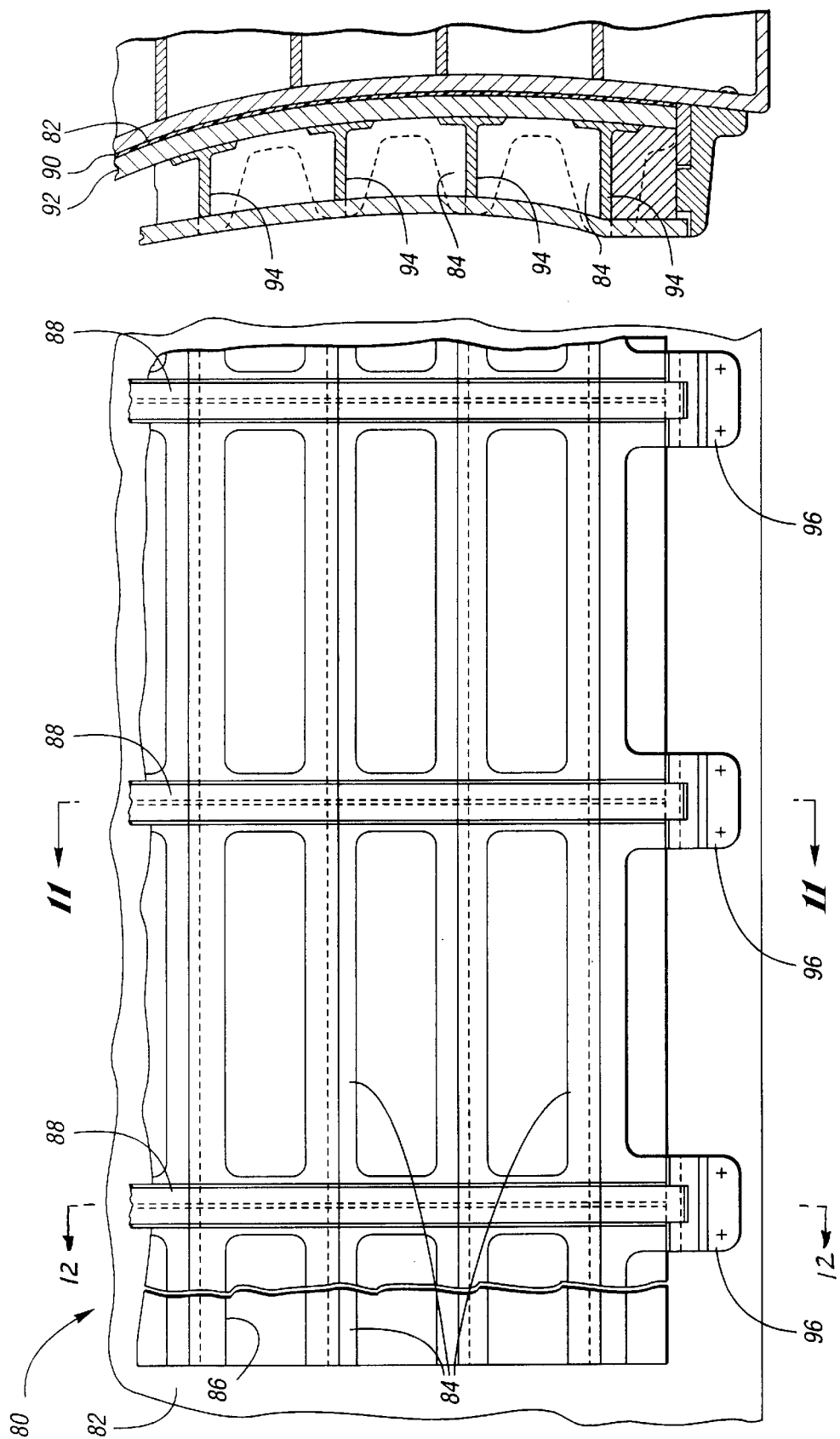

RESIN FILM INFUSION MOLD TOOLING AND MOLDING METHOD

STATEMENT OF GOVERNMENT RIGHTS

This invention was made under Contract No. NAS1-20546 awarded by NASA. The Government has certain rights in this invention.

TECHNICAL FIELD

The invention relates to a method and apparatus for resin film infusion molding a component in a single-step molding operation.

BACKGROUND ART

Due to the size of composite parts such as airplane wings, composite part formation in a single step molding process has heretofore not been possible. No method has been developed for molding parts up to 70 feet in length, while holding critical dimensional features within narrow tolerance ranges, nor for producing composite components of sufficient structural integrity to satisfy design requirements.

Conventional composite part fabrication for such components typically involves the assembly of separate prefabricated details through co-bonding, secondary bonding, and/or mechanical fastening to build up structural components with multiple loading requirements. This type of manufacturing process involves the use multiple molding tools, as well as multiple processing steps.

Typically, various composite part components are molded independently, and then secured together by bonding or mechanical fastening in order to satisfy dimensional and loading requirements. These processes are highly labor intensive and require expensive tooling.

Accordingly, it is desirable to provide an apparatus and method for composite part fabrication in which very large composite parts may be molded on a single molding tool in a single-step molding operation.

DISCLOSURE OF THE INVENTION

The present invention overcomes the above-referenced shortcomings of prior art composite part assembly processes by providing a method and an apparatus which utilize an inner mold tool mounted on an outer mold tool, wherein the inner mold tool comprises a plurality of mandrels located with respect to the outer mold tool by a plurality of locating bars. Accordingly, an exceptionally large composite part may be molded between the outer mold tool and inner mold tool within tight manufacturing tolerances by means of the locating bars accurately positioning the plurality of mandrels.

More specifically, a first aspect of the invention provides a mold apparatus for resin film infusion molding, which includes an outer mold tool having a facing sheet adapted to support a resin film and preform assembly. The facing sheet includes attachment features extending therefrom. An inner mold tool is positioned on the facing sheet to enclose the resin film and preform assembly for resin film infusion molding. The inner mold tool comprises a plurality of mandrels positioned for engagement with respect to the resin film and preform assembly. Each mandrel includes a slot formed therein, and a plurality of locating bars cooperates with the slots and with the attachment features for locating the mandrels longitudinally on the outer mold tool.

Preferably, a plurality of shims is arranged in cooperation with the mandrels for locating the mandrels laterally on the outer mold tool.

Another aspect of the invention comprises a method of resin film infusion molding, including: 1) providing an outer mold tool having a facing sheet adapted to support a resin film and preform assembly; 2) laying a resin film on the facing sheet; 3) positioning a preform assembly on the resin film; 4) installing a plurality of mandrels over the preform assembly; 5) locating the mandrels in desired locations by attaching locating bars over the mandrels and securing the locating bars with respect to the facing sheet; and 6) applying heat and pressure to facilitate the resin film infusion molding.

Accordingly, an object of the present invention is to provide a method and apparatus for resin film infusion molding in which a large composite part may be molded as a single component on a large molding tool.

Another object of the invention is to provide a method and apparatus for resin film infusion molding in which a large composite part, such as an airplane wing, can be molded within narrow manufacturing tolerances.

While embodiments of this invention are illustrated and disclosed, these embodiments should not be construed to limit the claims. It is anticipated that various modifications and alternative designs may be made without departing from the scope of this invention.

BRIEF DESCRIPTION OF THE DRAWINGS

FIG. 10 shows a cut-away plan view of a molding tool in accordance with a third alternative embodiment of the invention;

FIG. 11 shows a cut-away sectional view taken at line 11—11 of FIG. 10;

BEST MODES FOR CARRYING OUT THE INVENTION

The present invention provides a method and apparatus for resin film infusion molding of large composite parts. The primary function of the resin film infusion mold tool of the present invention is to define the entire geometry of the part in a single process cycle, thereby completely eliminating any subsequent assembly or bonding processes.

This unique tooling approach is capable of defining critical dimensional features of the part being fabricated with minimal thermal mass and minimal part count. With this tooling approach, complex three dimensional part geometries up to 100 feet in length and up to 30 feet in width on lofted surfaces with integral stiffening and attachment details may be molded as a single piece unit, thus saving assembly and tooling costs normally associated with a mechanically fastened or bonded structure. Critical part datums can be defined within narrow engineering tolerances to enable assembly of a large aircraft structure with minimal shimming, typically associated with non-monolithic components constructed from subassemblies.

Figure 1:
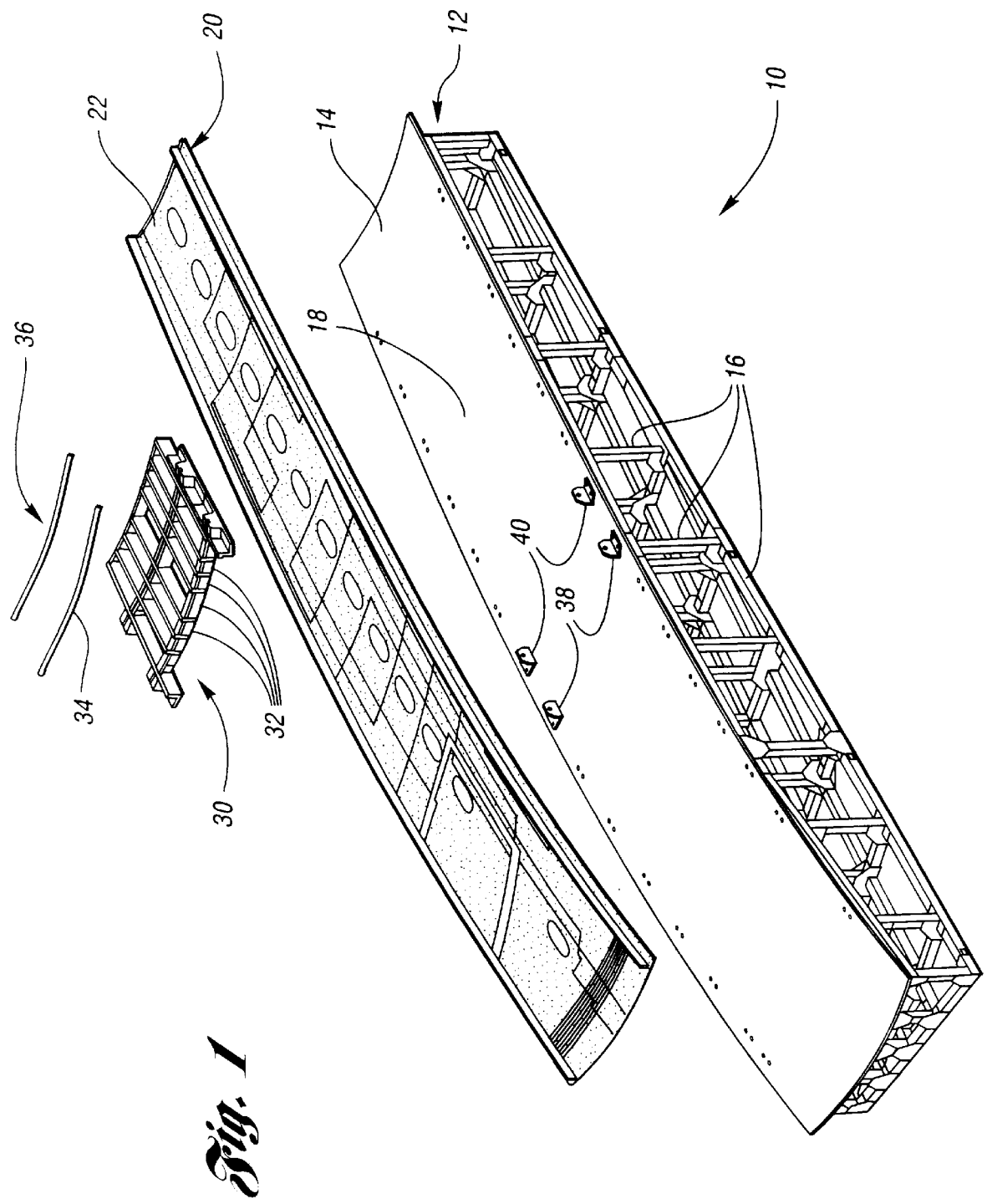
FIG. 1 shows an exploded perspective view of a molding tool in accordance with a first embodiment of the invention.
Figure 2:
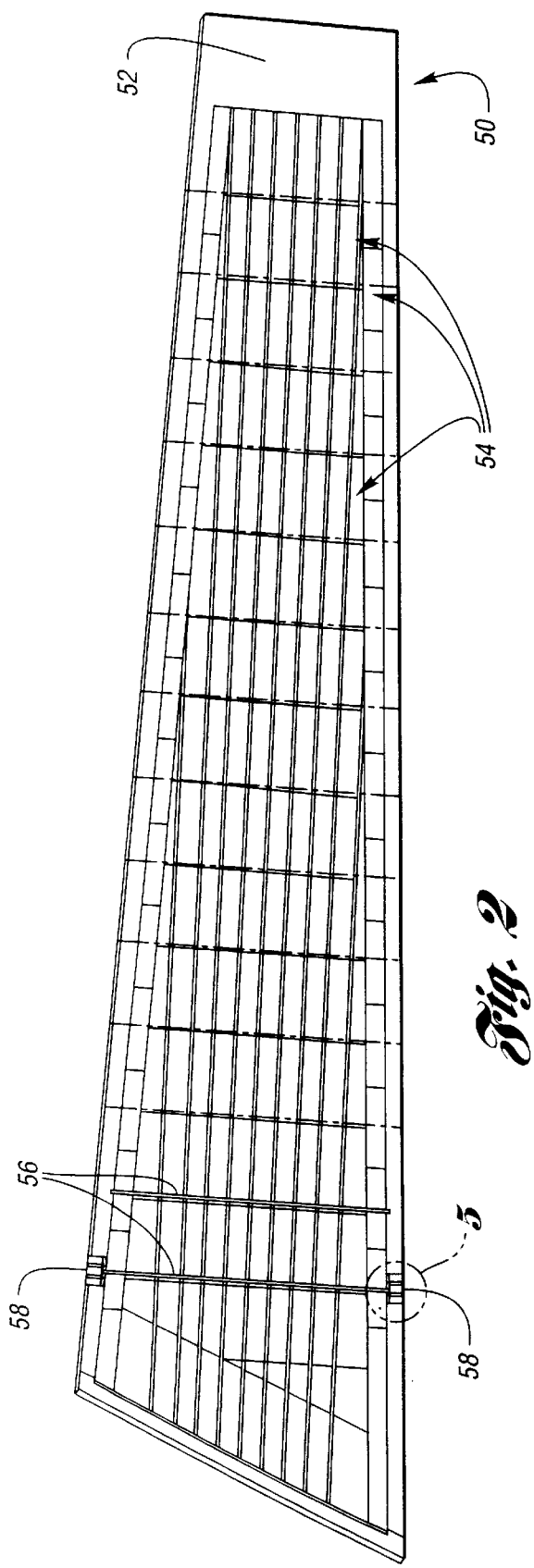
FIG. 2 shows a plan view of a molding tool in accordance with a second embodiment of the invention.
Figure 3:
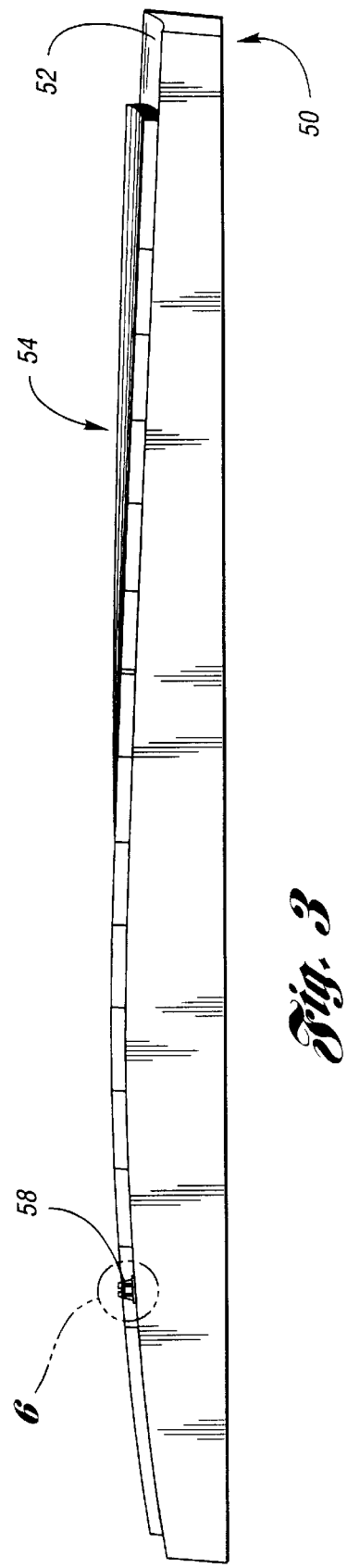
FIG. 3 shows a side view of the molding tool of FIG. 2.
Figure 4:
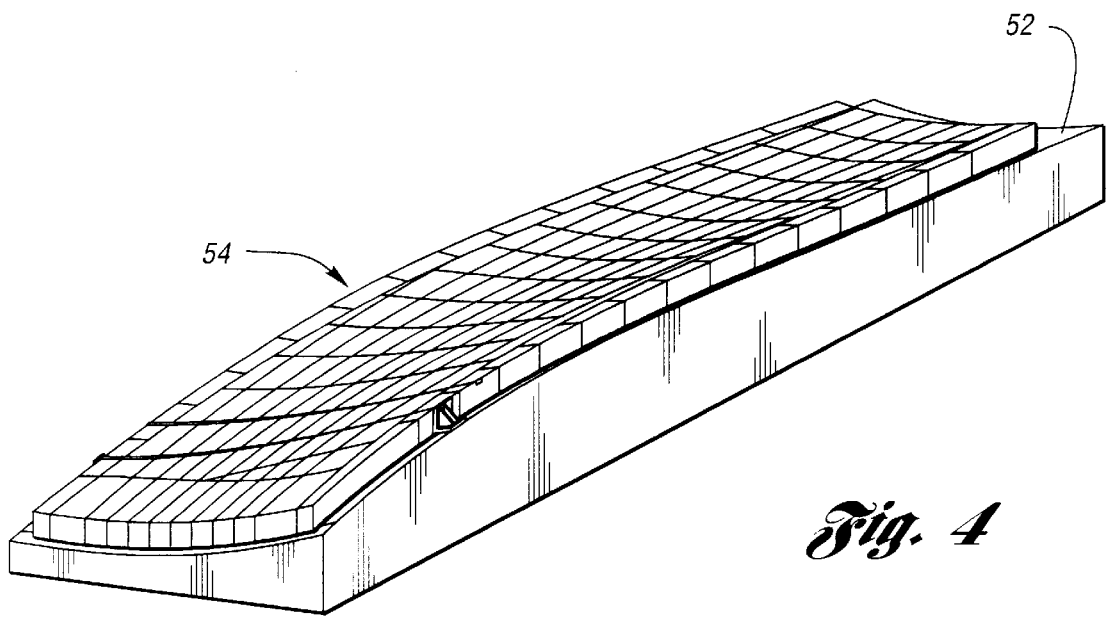
FIG. 4 shows a perspective view of the molding tool of FIG. 2.

The resin film infusion molding tool 10 of the present invention, as shown in FIG. 1, comprises an outer mold tool 12, which includes a facing sheet 14 supported by a support structure 16.

A resin film 18 is positioned on the facing sheet 14, and a preform assembly 20 is positioned on the resin film 18. The preform assembly preferably comprises a preform skin 22 having a plurality of stringers and intercostals stitched thereto (more clearly shown in FIG. 13, items 114 and 116, respectively) as described in U.S. Pat. No. 5,281,388.

The resin film infusion molding tool further comprises an inner mold tool 30 positioned over the facing sheet 14 to enclose the resin film 18 and preform assembly 20 for molding. The inner mold tool 30 includes a plurality of mandrels 32 positioned for engagement with the resin film 18 and preform assembly 20. In FIG. 1, only a portion of the mandrels 32 are illustrated. Locating bars 34,36 cooperate with the mandrels 32 for longitudinally locating the mandrels 32 along the length of the facing sheet 14. The locating bars 34,36 cooperate with the locating angles 38,40, respectively, for attaching the mandrels 32 to the facing sheet 14 and for properly locating the mandrels longitudinally along the facing sheet 14.

In the modular design, the mandrels 32 may be individually assembled over the preform assembly 20 such that the surface configurations on the underside of the mandrels 32 match with the stringers and intercostals 26 of the preform assembly 20 for molding.

Preferably, the process comprises stitching stacks of dry carbon fiber sheets together, and stitching graphite stringers and intercostal components to the stacks. The resin film 18 is preferably an epoxy base material comprising variably shaped resin tiles which are frozen to 0° F., and warmed to room temperature. The inner mold tool 30, comprising the plurality of mandrels 32, is assembled over the resin film 18 and preform assembly 20, as described above, such that the mandrels fit into bays or pockets between the stringers and intercostals of the preform assembly 20. Once the locating bars 34 have been properly inserted for locating the mandrels, the entire tool assembly is sealed with bag sealant tape, Mylar tape, or a silicon rubber seal.

The entire assembly is then bagged with a silicon rubber vacuum bag, which is sealed, and air is vacuumed out of the bag. The tool assembly is then placed into an autoclave, which is similar to a pressurized oven. A temperature of 350° F. and pressure of approximately 100 psi is applied within the autoclave for approximately 10–20 hours. The majority of the tool, particularly the mandrels 32, are aluminum for proper thermal responsiveness. Preferably, the mandrels 32 are at least partially hollowed out to reduce the mass for improved thermal responsiveness.

Turning to FIGS. 2–6, an alternative embodiment of the invention is shown. In this embodiment, the resin film infusion molding tool assembly 50 includes a contoured facing sheet 52 with a plurality of mandrels 54 disposed thereon for forming the molded part. A plurality of locating bars 56 is provided for properly locating the mandrels 54 longitudinally along the facing sheet 52.

Figure 5:
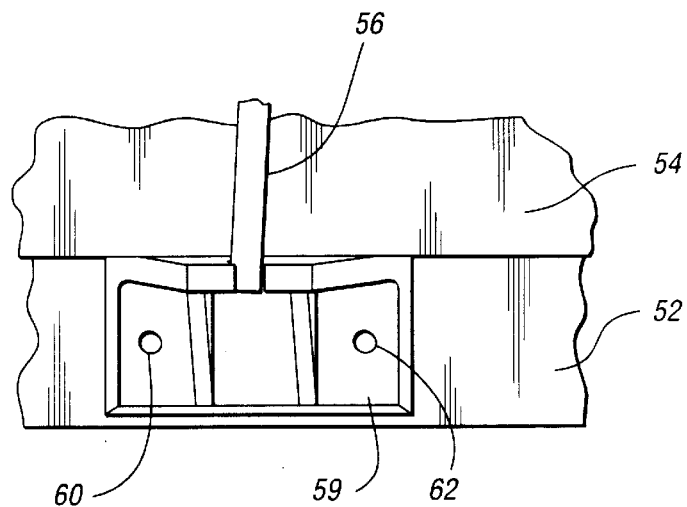
FIG. 5 shows an enlarged cut-away view of detail 5 of FIG. 2.
Figure 6:
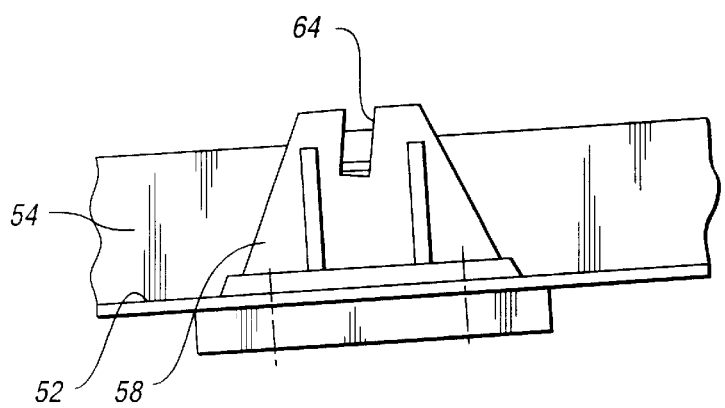
FIG. 6 shows an enlarged cut-away view of detail 6 of FIG. 3.

Interface of the locating bars 56 to the facing sheet 52 is illustrated in FIGS. 5 and 6. As shown, brackets 58 are secured to the facing sheet 52 by fasteners 60,62. A slot 64 is formed in each bracket 58 for receiving the respective ends of the locating bars 56. Such brackets 58 replace the locating angles 38,40 described with reference to the embodiment shown in FIG. 1.

Figure 7:
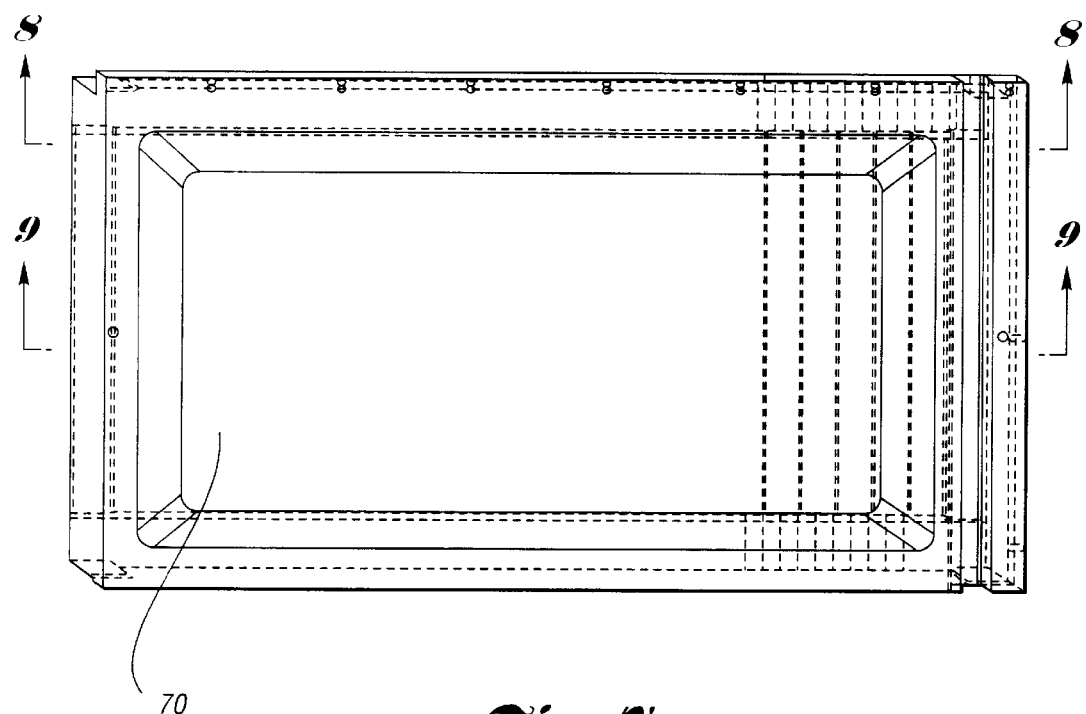
FIG. 7 shows a plan view of a mandrel for use with the embodiment shown in FIG. 2.
Figure 8:
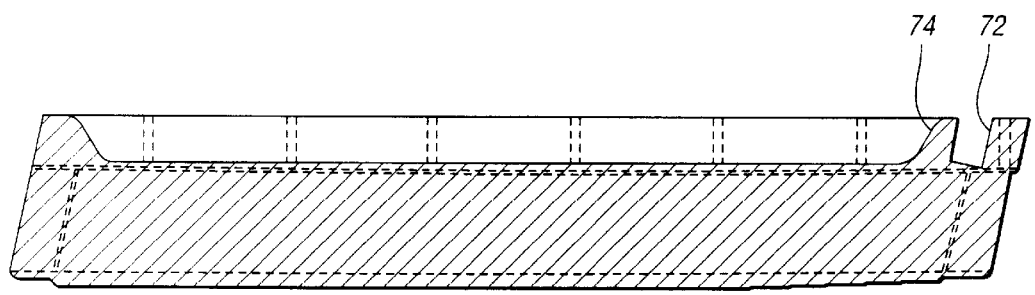
FIG. 8 shows a sectional view taken at line 8—8 of FIG. 7.
Figure 9:
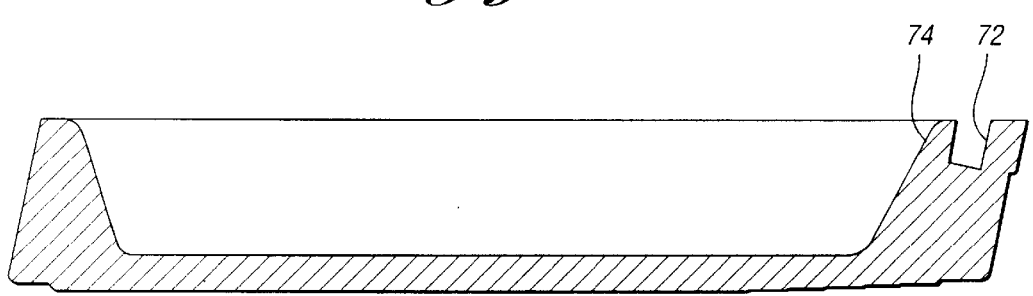
FIG. 9 shows a sectional view taken at line 9—9 of FIG. 7.

Turning to FIGS. 7–9, an exemplary mandrel 70 is illustrated. As shown, the mandrel 70 preferably includes slots 72 formed therein for cooperation with the locating bars for locating the mandrels longitudinally along the length of the facing sheet. Also, the mandrel 70 preferably includes a hollowed-out portion 74 for weight reduction and thermal responsiveness.

Figure 12:
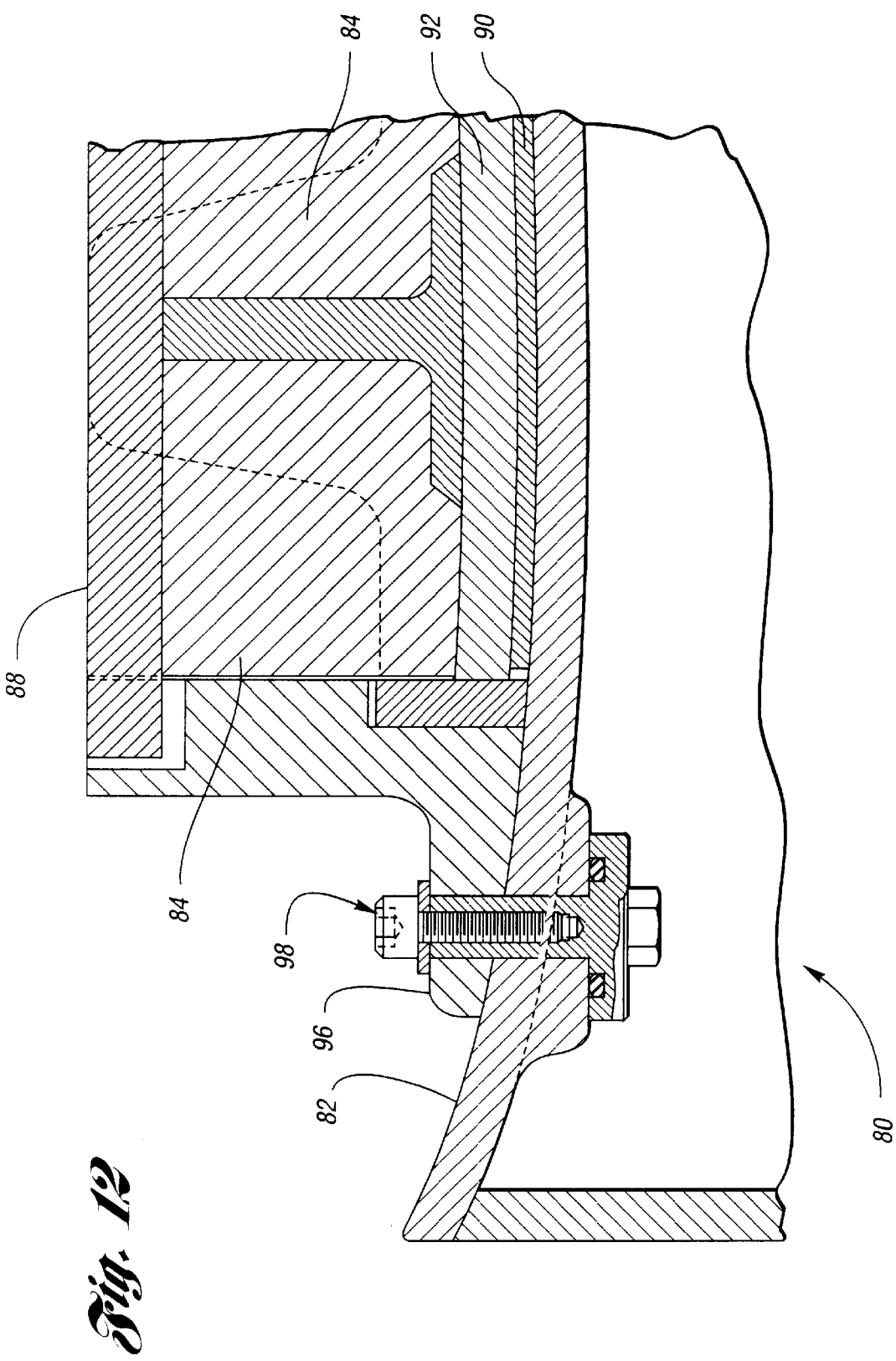
FIG. 12 shows a partial cut-away sectional view of the molding tool of FIG. 10 as seen from the plane of section line 12—12 of FIG. 10.

Referring to FIGS. 10–12, a third embodiment of the invention is shown. In this embodiment, the tooling assembly 80 includes a facing sheet 82 with a plurality of mandrels 84 secured thereto. The mandrels 84 include hollowed portions 86, and locating bars 88 to locate the mandrel 84 longitudinally along the facing sheet 82. A resin film 90 and skin preform assembly 92 are positioned over the facing sheet 82, and the stringer webs 94 extend between the mandrels 84.

The brackets 96 are secured to the facing sheet 82 by the through-bolt assembly 98, as shown in FIG. 12, for indexing the locating bars 88.

Figure 13:
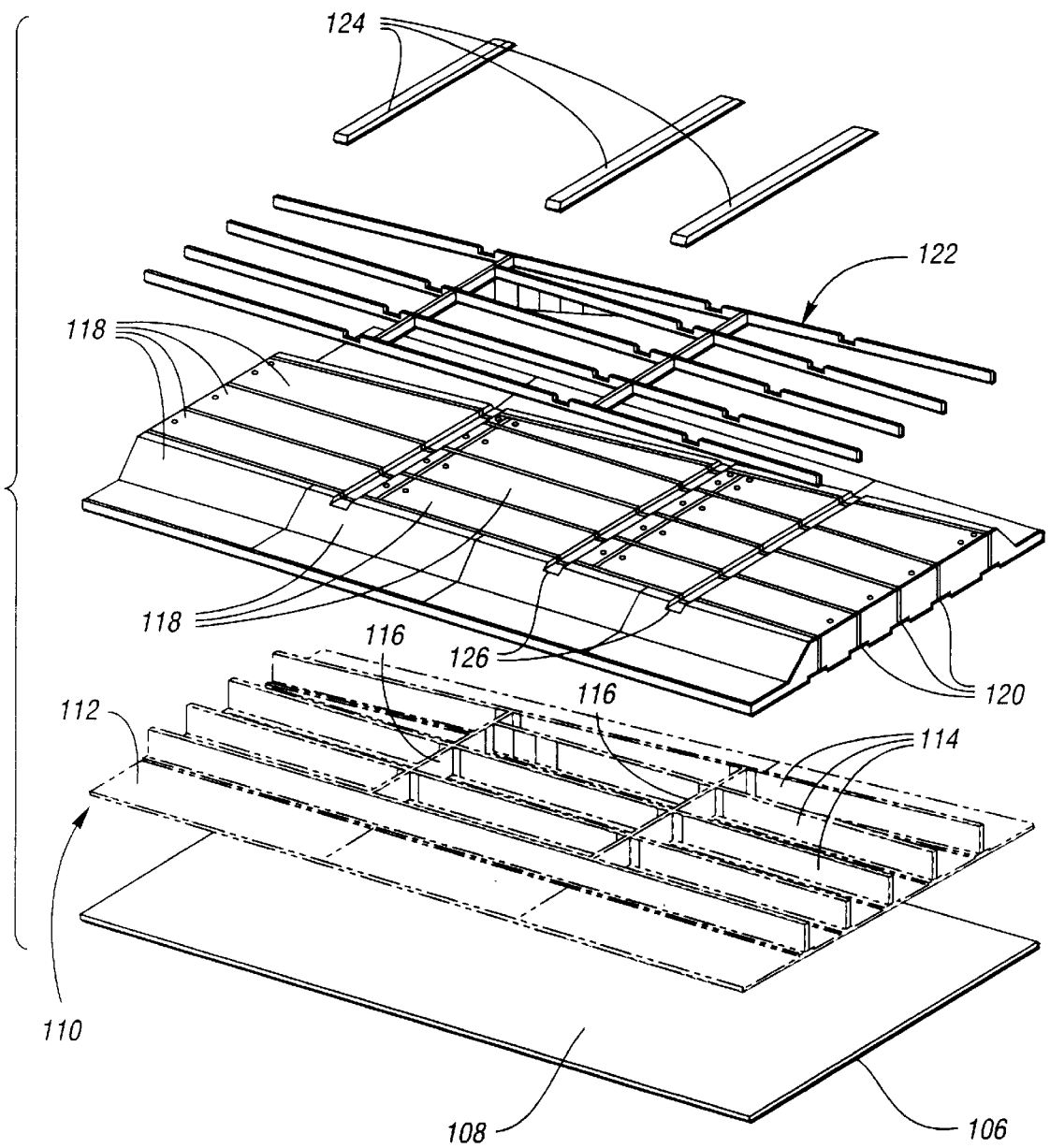
FIG. 13 shows a schematically arranged exploded perspective view of a molding tool in accordance with a fourth embodiment of the invention.

Turning to FIG. 13, a fourth embodiment of the present invention is shown. In this embodiment, an outer mold tool facing plate 106 is substantially flat with a resin film 108 disposed thereon. A preform assembly 110, positioned over the resin film 108, includes a preform skin 112 with stringers 114 and intercostals 116 stitched thereto. A plurality of mandrels 118 are assembled over the preform assembly 110 such that the stringers 114 and intercostals 116 extend into the slots 120 formed between the mandrels 118. A tooling shim assembly 122 is installed over the mandrels 118 into the slots 120 for laterally locating the mandrels 118. A plurality of locating bars 124 is positioned on top of the mandrels 118 within the slots 126 formed therein for locating the mandrels 118 longitudinally along the facing sheet 106. The embodiment shown in FIG. 13 is preferably used for manufacturing smaller parts. Therefore, the mandrels 118 need not be hollowed out for thermal responsiveness or weight reduction. The tooling assembly shown in FIG. 13 is useful in manufacturing flat composite integrally stiffened panels, such as flat bulkhead or floor panels.

A method of resin film infusion molding in accordance with the present invention comprises the following steps: a) providing an outer mold tool having a facing sheet adapted to support a resin film and preform assembly; b) laying a resin film on the facing sheet; c) positioning a preform assembly on the resin film; d) installing a plurality of mandrels over the preform assembly; e) locating the mandrels in desired locations by attaching locating bars over the mandrels and securing the locating bars with respect to the facing sheet; and f) applying heat and pressure to facilitate resin film infusion molding.

Preferably, the step of locating the mandrels further comprises securing a plurality of shims to the mandrels for locating the mandrels laterally on the facing sheet.

While embodiments of the invention have been illustrated and described, it is not intended that such disclosure illustrate and describe all possible forms of the invention. It is intended that the following claims cover all modifications and alternative designs, and all equivalents, that fall within the spirit and scope of this invention.

What is claimed is:

1. A mold apparatus for resin film infusion molding, comprising:

an outer mold tool having a facing sheet adapted to support a resin film and preform assembly, the facing sheet having attachment features extending therefrom; and an inner mold tool positioned on the facing sheet to enclose the resin film and preform assembly for resin film infusion molding, the inner mold tool including a plurality of metal mandrels positioned for engagement with the resin film and preform assembly, wherein each mandrel includes a slot formed therein, and a plurality of locating bars cooperating with the slots and with the attachment features for locating the mandrels longitudinally on the outer mold tool, wherein the plurality of mandrels are arranged to form a molded product having a dimensionally-accurate vertical grid structure of stringers and intercostals such that the mandrels fit into pockets between the stringers and intercostals to form the grid structure; and wherein the plurality of mandrels comprises a modular design such that the mandrels are adapted for assembly individually over the preform assembly.

2. The mold apparatus of claim 1, further comprising a plurality of tooling shims integrated into the mandrels for locating the mandrels laterally on the outer mold tool.

3. The mold apparatus of claim 2, wherein the mandrels are partially hollowed for thermal responsiveness and weight reduction.

4. The mold apparatus of claim 1, wherein the outer mold tool further comprises a plurality of support bars supporting the facing sheet.

5. A mold apparatus for resin film infusion molding, comprising:

an outer mold tool having a facing sheet adapted to support a resin film and preform assembly, the facing sheet having attachment features extending therefrom; and an inner mold tool positioned over the facing sheet to enclose the resin film and preform assembly for molding, the inner mold tool including a plurality of metal mandrels positioned for engagement with the resin film and preform assembly, a plurality of tooling shims cooperating with the mandrels for laterally locating the mandrels, and a plurality of locating bars cooperating with the mandrels and with the attachment features for longitudinally locating the mandrels, wherein the plurality of mandrels are arranged to form a molded product having a dimensionally-accurate vertical grid structure of stringers and intercostals such that the mandrels fit into pockets between the stringers and intercostals to form the grid structure: and wherein the plurality of mandrels comprises a modular design such that the mandrels are adapted for assembly individually over the preform assembly.

6. The mold apparatus of claim 5, wherein the mandrels are partially hollowed for thermal responsiveness and weight reduction.

7. The mold apparatus of claim 5, wherein the outer mold tool further comprises a support bar structure supporting the facing sheet.

8. A method of resin film infusion molding, comprising:

providing an outer mold tool having a facing sheet adapted to support a resin film and preform assembly;

laying a resin film on the facing sheet;

positioning a preform assembly on the resin film;

installing a plurality of metal mandrels individually over the preform assembly;

locating the mandrels in desired locations by attaching locating bars over the mandrels and securing the locating bars with respect to the facing sheet; and applying heat and pressure to facilitate resin infusion molding to form a molded product having a dimensionally-accurate vertical grid structure of stringers and intercostals formed by the mandrels.

9. The method of claim 8, wherein said step of locating the mandrels further comprises securing a plurality of shims onto the mandrels for locating the mandrels laterally on the facing sheet.

* * * * *